(12) United States Patent
Eppolito (10) Patent No.: US 8,751,022 B2
(45) Date of Patent: Jun. 10, 2014

(54) MULTI-TAKE COMPOSITING OF DIGITAL MEDIA ASSETS

(75) Inventor: Aaron Eppolito, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 1378 days.

(21) Appl. No.: 11/735,468

(22) Filed: Apr. 14, 2007

(65) Prior Publication Data

US 2008/0255687 A1    Oct. 16, 2008

(51) Int. Cl.
| | | |
|---|---|---|
| *G06F 17/00* | (2006.01) | |
| *G10L 21/00* | (2013.01) | |
| *G06F 3/00* | (2006.01) | |

(52) U.S. Cl.
USPC .......................... 700/94; 704/278; 715/716

(58) Field of Classification Search
USPC .................. 700/94; 704/278; 381/119; 369/4
See application file for complete search history.

(56) References Cited

U.S. PATENT DOCUMENTS

| | | | |
|---|---|---|---|
| 4,558,302 A | 12/1985 | Welch | |
| 4,591,928 A | 5/1986 | Bloom et al. | |
| 5,029,509 A | 7/1991 | Serra et al. | |
| 5,237,648 A | 8/1993 | Mills | |
| 5,365,254 A | 11/1994 | Kawamoto | |
| 5,467,288 A * | 11/1995 | Fasciano et al. | 715/716 |
| 5,536,902 A | 7/1996 | Serra et al. | |
| 5,732,184 A | 3/1998 | Chao | |
| 5,781,188 A | 7/1998 | Amiot et al. | |
| 5,792,971 A | 8/1998 | Timis et al. | |
| 5,852,435 A | 12/1998 | Vigneaux et al. | |
| 6,204,840 B1 | 3/2001 | Petelycky et al. | |
| 6,351,765 B1 | 2/2002 | Pietropaolo et al. | |
| 6,400,378 B1 | 6/2002 | Snook | |
| 6,597,375 B1 | 7/2003 | Yawitz | |
| 6,670,966 B1 | 12/2003 | Kusanagi | |
| 6,714,826 B1 | 3/2004 | Curley et al. | |
| 6,851,091 B1 | 2/2005 | Honda et al. | |
| 7,017,120 B2 | 3/2006 | Shnier | |
| 7,073,127 B2 | 7/2006 | Zhao et al. | |
| 7,085,995 B2 | 8/2006 | Fukuda et al. | |
| 7,120,859 B2 | 10/2006 | Wettach | |
| 7,208,672 B2 | 4/2007 | Camiel | |
| 7,213,036 B2 | 5/2007 | Apparao et | |
| 7,325,199 B1 | 1/2008 | Reid | |
| 7,336,890 B2 | 2/2008 | Lu et al. | |
| 7,372,473 B2 | 5/2008 | Venolia | |
| 7,437,682 B1 | 10/2008 | Reid | |
| 7,444,593 B1 | 10/2008 | Reid | |
| 7,541,534 B2 | 6/2009 | Schnepel et al. | |

(Continued)

OTHER PUBLICATIONS

Digidesign Inc., "Pro Tools Reference Guide Version 5.0.1 for Macintosh and Windows", 1999, Version 5.0.1, pp. 1-432.*

(Continued)

*Primary Examiner* — Davetta W Goins
*Assistant Examiner* — Daniel Sellers
(74) *Attorney, Agent, or Firm* — Kenyon & Kenyon LLP (57) ABSTRACT

Methods, graphical user interfaces, computer apparatus and computer readable medium for producing media content are disclosed. For example, a user of a computing device can utilize the methods, graphical user interfaces, computer apparatus, and computer readable medium to edit the media content. In one embodiment, the media content pertains to media tracks, such as audio or video tracks. The media content can be a plurality of individual media tracks that can be segmented and the resulting segments from different media tracks can be combined into a composite media track.

34 Claims, 9 Drawing Sheets

(56) References Cited

U.S. PATENT DOCUMENTS

| | | |
|---|---|---|
| 7,549,127 B2 | 6/2009 | Chasen et al. |
| 7,594,177 B2 | 9/2009 | Jojic et al. |
| 7,623,755 B2 | 11/2009 | Kuspa |
| 7,659,913 B2 | 2/2010 | Makela |
| 7,754,959 B2 | 7/2010 | Herberger et al. |
| 7,948,981 B1 | 5/2011 | Schnepel et al. |
| 2002/0026442 A1 | 2/2002 | Lipscomb et al. |
| 2002/0091761 A1 | 7/2002 | Lambert |
| 2002/0175932 A1 | 11/2002 | Yu et al. |
| 2003/0002851 A1 | 1/2003 | Hsiao et al. |
| 2003/0009485 A1 | 1/2003 | Turner |
| 2003/0018978 A1 | 1/2003 | Singal et al. |
| 2003/0122861 A1 | 7/2003 | Jun et al. |
| 2004/0027369 A1 | 2/2004 | Kellock et al. |
| 2004/0160416 A1 | 8/2004 | Venolia |
| 2004/0205358 A1 | 10/2004 | Erickson |
| 2004/0234250 A1 | 11/2004 | Cote et al. |
| 2005/0042591 A1 | 2/2005 | Bloom et al. |
| 2005/0114754 A1 | 5/2005 | Miller et al. |
| 2005/0235212 A1 | 10/2005 | Manousos et al. |
| 2005/0268279 A1 | 12/2005 | Paulsen et al. |
| 2006/0100978 A1 | 5/2006 | Heller et al. |
| 2006/0106764 A1 | 5/2006 | Girgensohn et al. |
| 2006/0120624 A1 | 6/2006 | Jojic et al. |
| 2006/0150072 A1 | 7/2006 | Salvucci |
| 2006/0156374 A1 | 7/2006 | Hu et al. |
| 2006/0165240 A1 | 7/2006 | Bloom et al. |
| 2006/0168521 A1* | 7/2006 | Shimizu et al. ............... 715/530 |
| 2006/0224940 A1 | 10/2006 | Lee |
| 2006/0236221 A1 | 10/2006 | McCausland et al. |
| 2006/0284976 A1 | 12/2006 | Girgensohn et al. |
| 2007/0118873 A1 | 5/2007 | Houh et al. |
| 2007/0185909 A1 | 8/2007 | Klein et al. |
| 2007/0240072 A1 | 10/2007 | Cunningham et al. |
| 2007/0292106 A1 | 12/2007 | Finkelstein et al. |
| 2008/0041220 A1 | 2/2008 | Foust et al. |
| 2008/0126387 A1 | 5/2008 | Blinnikka |
| 2008/0256136 A1 | 10/2008 | Holland |
| 2008/0256448 A1 | 10/2008 | Bhatt |
| 2008/0263433 A1 | 10/2008 | Eppolito et al. |
| 2008/0263450 A1 | 10/2008 | Hodges et al. |

OTHER PUBLICATIONS

Mike Thornton, "Achieving Better Vocal Sounds", Sound on Sound, Apr. 2005, pp. 1-4.*

John Walden, "Comp Performances", Sound on Sound, Mar. 2001, pp. 1-3.*

"Soundtrack Pro User Manual", Apple Computer, Inc., copyright 2005, 1-311 pages.

"What is Audio Post Production", Motion Picture Sound Editors, http://www.mpse.org/education/whatis.html, downloaded Feb. 1, 2008.

Office Action for U.S. Appl. No. 11/735,466 mailed Feb. 3, 2010.

"Adobe Audition—User Guide", Adobe Systems Inc., 2003.

"Adobe Audition 2.0", Adobe Systems Inc., Oct. 8, 2005.

"Adobe Studio on Adobe Audition 1.5—High Frequency Effects", Adobe Systems Inc., 2005.

Final Office Action for U.S. Appl. No. 11/735,466, mailed Jul. 20, 2010.

Office Action for U.S. Appl. No. 12/060,010, mailed Jul. 19, 2010.

Office Action for U.S. Appl. No. 12/060,010, mailed Jan. 6, 2011.

Office Action for U.S. Appl. No. 12/082,898, mailed Mar. 2, 2011.

Office Action for U.S. Appl. No. 12/082,899, mailed Mar. 2, 2011.

Office Action for U.S. Appl. No. 12/060,010, mailed May 7, 2012.

* cited by examiner

MULTI-TAKE COMPOSITING OF DIGITAL MEDIA ASSETS

BACKGROUND OF THE INVENTION

1. Field of the Invention

The present invention relates to media editing and, more particularly, to compositing media from multiple takes or pieces.

2. Description of the Related Art

In the course of producing a video, such as a movie, it is common for audio engineers (or sound engineer) to add multiple audio tracks to a video track. This task can be referred to as audio production. It takes a substantial effort to place the audio tracks in the proper position with respect to the video track. Often, the audio tracks are overlapping such as to provide background noise, dialog, musical instruments, sound effects, etc. There are software programs that assist audio engineers with these tasks. One example of an existing software program for audio editing/production application is "Soundtrack Pro" available from Apple Inc. of Cupertino, Calif.

There is often a need to consider a plurality of "takes" of the same audio material. For example, when automatic dialog replacement is being performed, dialog for a scene is often recreated in a studio. When recreating dialog, an actor or voice professional may utilize several takes, whereby the dialog can be repeated several times. The audio engineer can then choose the best of the takes to assign to the audio track. However, often, no one take is perfect. In such case, if the audio engineer desires to manipulate the audio, then the audio engineer has to manually form a resulting audio track. This manually process imposed on the audio engineer is difficult, time consuming and offers little flexibility. Similar difficulties occur when an audio engineer needs to cut together multiple takes of a musical performance of an artist, choir, band, etc. Thus, there is a need for improved approaches to facilitate usage of multiple takes.

SUMMARY OF THE INVENTION

The invention pertains to methods, graphical user interfaces, computer apparatus and computer readable medium for producing media content. For example, a user of a computing device can utilize the methods, graphical user interfaces and computer readable medium to edit the media content. In one embodiment, the media content pertains to media tracks, such as audio or video tracks. The media content can be a plurality of individual media tracks that can be segmented and the resulting segments from different media tracks can thereafter be combined into a composite media track.

The invention can be implemented in numerous ways, including as a method, system, device, apparatus (including graphical user interface), or computer readable medium. Several embodiments of the invention are discussed below.

As a computer-implemented method for producing a composite media asset from a plurality of digital media assets, one embodiment of the invention includes at least: accessing a plurality of digital media assets; forming media segments with respect to the digital media assets; and receiving selections of the media segments from one or more of the digital media assets.

As a computer-implemented method for producing a composite audio recording from a plurality of individual recordings, one embodiment of the invention includes at least: obtaining a plurality of individual recordings; concurrently displaying the individual recordings; configuring transition points with respect to the individual recordings, thereby forming media segments with respect to the individual recordings; receiving selections of the media segments from different ones of the individual recordings; and combining the selected media segments into a composite audio recording.

As a graphical user interface for producing a composite digital media asset from a plurality of available digital media assets, one embodiment of the invention includes at least: a time line; a plurality of digital media track representations displayed with respect to said time line, the digital media track representations corresponding to and representing available digital media asset tracks; at least one region indicator that denotes different regions for the available digital media asset tracks, the at least one region indicator being user configurable; and a user control that enables a user to select one or more of the available digital media asset tracks for utilization in each of the different regions.

As a graphical user interface for producing a composite media asset from a plurality of individual assets, one embodiment of the invention includes at least: a time line; a plurality of individual media track representations displayed with respect to said time line, the individual media track representations corresponding to and representing individual media tracks; and a composite media track representation displayed with respect to said time line. The composite media track representation can correspond to and represent a composite media track formed from different portions of the individual media tracks.

As a computer readable medium including at least computer program code for producing a composite audio recording from a plurality of digital media assets, one embodiment of the invention includes at least: computer program code for obtaining a plurality of digital media assets; computer program code for concurrently displaying the digital media assets; computer program code for forming regions with respect to the digital media assets; computer program code for receiving selections of the regions from different ones of the digital media assets; and computer program code for forming a composite recording based on the region selections.

As a computer-implemented method for producing a composite audio recording from a plurality of individual recordings, one embodiment of the invention includes at least: displaying a first audio track representation including a waveform of audio content of a first audio track; displaying a second audio track representation including a waveform of audio content of a second audio track; displaying a first transition indicator across both the first audio track representation and the second audio track representation; segmenting the first audio track into a plurality of segments based on at least the first transition indicator; segmenting the second audio track into a plurality of segments based on at least the first transition indicator; receiving a first user selection of one of the segments of the first audio track or the second audio track as a first selected segment; receiving a second user selection of one of the segments of the first audio track or the second audio track as a second selected segment; and displaying a composite audio track representation. The composite audio track representation can include a waveform of audio content of a composite audio track. The composite audio track representation is a waveform that is a composite from (i) at least a portion of the waveform of audio content of the first audio track or the second audio track corresponding to the first selected segment and (ii) at least a portion of the waveform of audio content of the first audio track or the second audio track corresponding to the second selected segment.

As a computing apparatus, one embodiment of the invention includes at least: an audio pickup device suitable for obtaining multiple takes of a particular audio recording; a display device capable of concurrently displaying the multiple takes; a memory configured to store at least audio content pertaining to the multiple takes; and a processing device. The processing device operates to at least: cause the multiple takes to be displayed on the display device in an adjacent manner; form regions with respect to the multiple takes; receive region selections from the regions formed with respect to the multiple takes; and associate audio segments associated with the region selections to form a composite audio recording.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to methods, graphical user interfaces, computer apparatus and computer readable medium for producing media content. For example, a user of a computing device can utilize the methods, graphical user interfaces, computer apparatus, and computer readable medium to edit the media content. In one embodiment, the media content pertains to media tracks, such as audio or video tracks. The media content can be a plurality of individual media tracks that can be segmented and the resulting segments from different media tracks can thereafter be combined into a composite media track.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
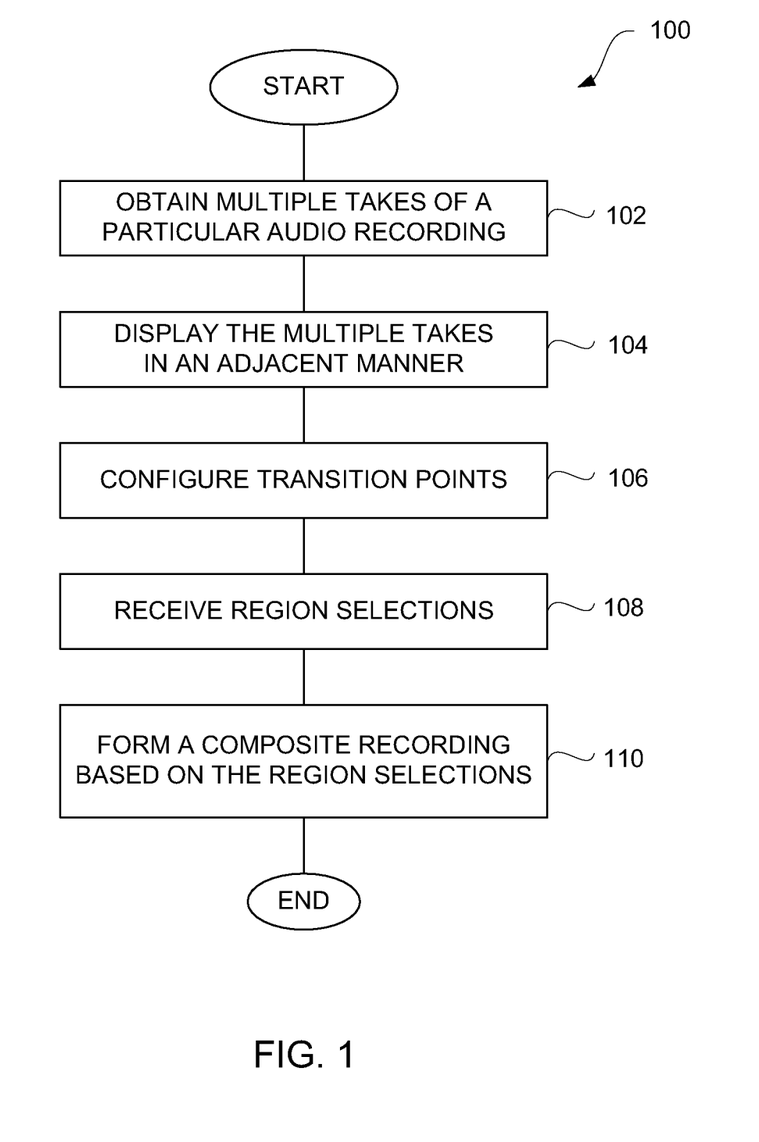
FIG. 1 is a flow diagram of an audio editing process according to one embodiment of the invention.

FIG. 1 is a flow diagram of an audio editing process 100 according to one embodiment of the invention. The audio editing process 100 can be performed by a computing device, such as a personal computer.

The audio editing process 100 can obtain 102 multiple takes of a particular audio recording. The multiple takes are typically takes of generally similar audio content. For example, if the audio is user speech, the user might say the word, sentence or phrase multiple times, each of which can be considered a "take". As another example, if the audio is a sound effect, the sound effect could be recorded multiple times.

The multiple takes can then be displayed 104 in an adjacent manner. The computing device typically has a display device and the multiple takes can be displayed 104 on the display in an adjacent manner. As one example, the multiple takes can be displayed in a vertically stacked manner. However, the multiple takes can be concurrently displayed is various other ways. In addition, transition points can be configured 106. The transition points are established with respect to the multiple takes and serve to effectively divide up audio content for an audio recording into a plurality of regions. In one implementation, a user can interact with user interface controls to establish, move, resize, etc. one or more transition points. By establishing and/or manipulating transition points, the position and number of transition points for the multiple takes can be established.

Next, region selections can be received 108. Here, the user can make selections from the different regions from the different takes. Hence, after the region selections have been received 108, a composite recording can be formed 110 based on the region selections. In one implementation, it is assumed that a user interacts with user interface controls to select desired regions from the multiple takes that are to be combined and utilized as a composite recording. The composite recording is typically also displayed on the display device. Following the block 110, the audio editing process 100 can end.

Figure 2:
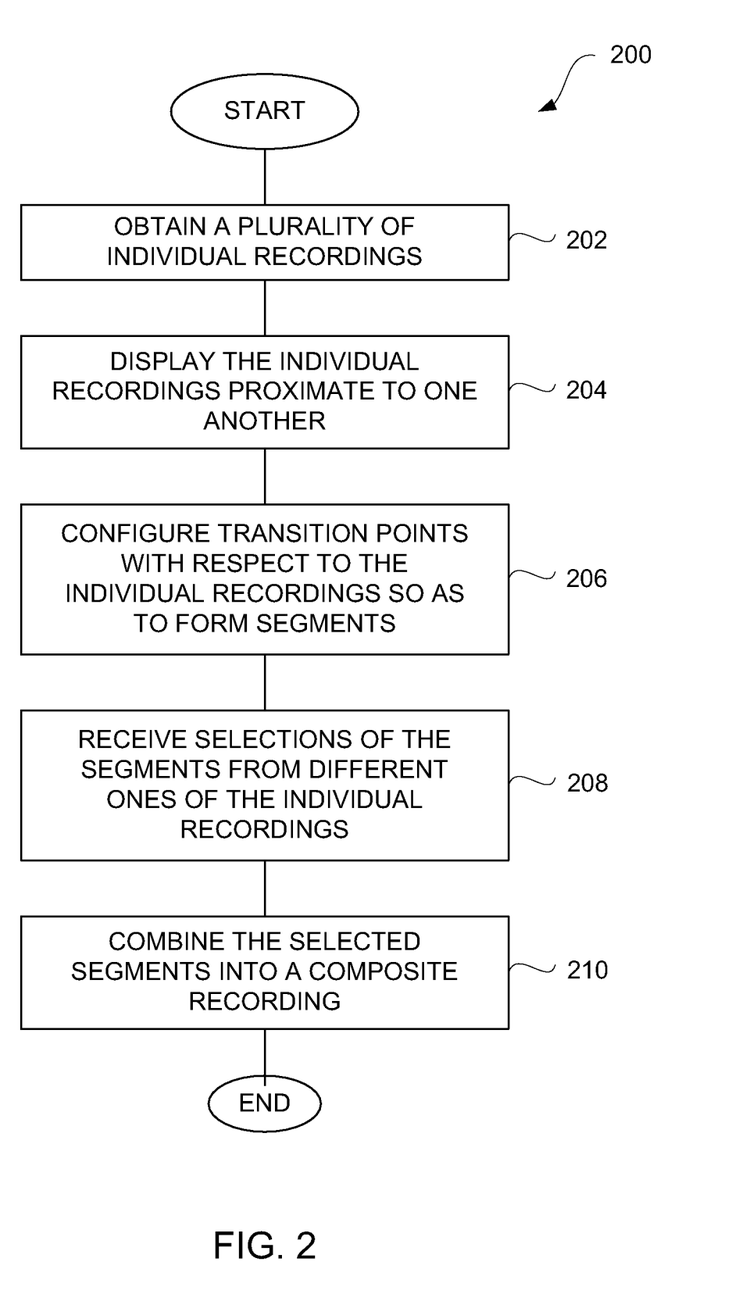
FIG. 2 is a flow diagram of a media editing process according to one embodiment of the invention.

FIG. 2 is a flow diagram of a media editing process 200 according to one embodiment of the invention. The media editing process 200 is, for example, performed by a computing device, such as a personal computer.

The media editing process 200 can obtain 202 a plurality of individual recordings. The individual recordings can be displayed 204 proximate to one another. In one implementation, the individual recordings are displayed 204 on a display device associated with the computing device that performs the media editing process 200.

Next, transition points can be configured 206 with respect to the individual recordings so as to form segments. For a given individual recording, the segments formed based on the transition points result in selectable segments of the associated individual recording. After the segments are formed, selections of the selectable segments from different ones of the individual recordings can be received 208. The selectable segments from the various individual recordings can then be combined 210 to form a composite recording. Following the block 210, the media editing process 200 can end.

With respect to the media editing process 200, in one embodiment, the individual recordings are audio recordings, and the composite recording is a composite audio recording. Alternatively, in another embodiment, the individual recordings are video recordings, and the composite recording is a composite video recording. More generally, the media editing process 200 operate on digital media assets. For example, in one embodiment, the media editing process 200 operates on arbitrary audio assets, where individual recordings are only one type of audio assets.

With respect to the media editing process 100 or the media editing process 200, once formed, the resulting composite recording can thereafter be used as a single object by a production application or other application. Also, should there be a need to re-visit the editing utilized to form the composite recording, the resulting composite recording can be re-opened in the media editing process so as to again be able to modify its constituent regions/segments as before.

Figure 3:
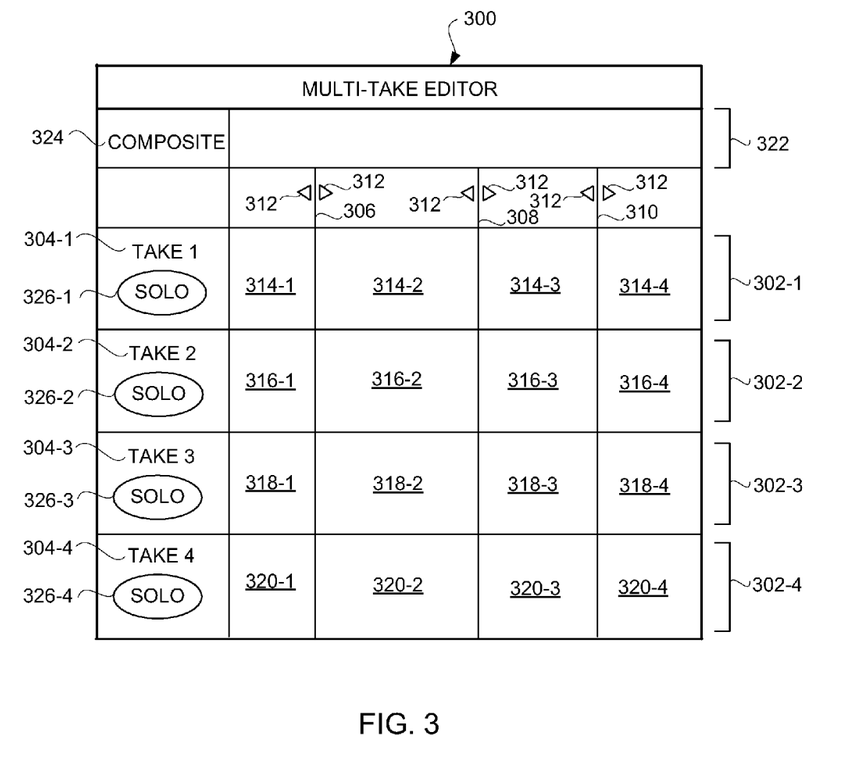
FIG. 3 is a diagram of a media edit window according to one embodiment of the invention.

FIG. 3 is a diagram of a media edit window 300 according to one embodiment of the invention. The media edit window 300 is a graphical user interface that can be presented on a display associated with a computing device. The media edit window 300 pertains to a multi-take editor. The multi-take editor is an editor that allows a user to edit multiple takes of a generally common recording. In general, the multi-take editor will enable a user to mix segments from different media recordings to produce a composite recording. The different media recordings can, in one embodiment, be referred to as "takes."

The media edit window 300 includes a plurality of tracks, namely, media tracks, that are arranged in an adjacent manner. As illustrated in FIG. 3, the media track 302-1 can be labeled as "take 1" by track label 304-1. Similarly, media track 302-2 can be labeled "take 2" by track label 304-2. The media track 302-3 can also be labeled "take 3" by track label 304-3. A fourth media track 304-4 can be labeled "track 4" by track label 304-4.

The media edit window 300 also includes transition points 306, 308 and 310. The transition points 306, 308 and 310 can be moved or re-sized by a user interacting with transition controls 312. The first track 302-1 is divided into four distinct segments, first segment 314-1, second segment 314-2, third segment 314-3 and fourth segment 314-4. The segments for the first track 302-1 are designated by the transition points 306, 308 and 310. The second track 302-2 includes segments 316-1, 316-2, 316-3 and 316-4. The third track 302-3 includes segments 318-1, 318-2, 318-3 and 318-4. The fourth track 302-4 includes segments 320-1, 320-2, 320-3 and 320-4. At this point, a user can interact with the media edit window 300 to select different segments across the different takes to form a composite track 322 which is identified by a composite label 324. For example, the resulting composite track 322 will result from the combination of the four selected segments from any of the tracks 302-1, 302-2, 302-3 and 302-4.

In addition, each of the tracks 302-1, 302-2, 302-3 and 302-4 can include a "solo" control 326. On selection of the "solo" control 326, the associated track can then be utilized in its entirety as the composite track 322. For example, if the solo control 326-1 were selected, the composite track 322 would update to pertain to the first track 302-1. If the solo control 326-2 were selected, the composite track 322 would update to pertain to the second track 302-2. If the solo control 326-3 were selected, the composite track 322 would update to pertain to the third track 302-3. If the solo control 326-4 were selected, the composite track 322 would update to pertain to the fourth track 302-4. In one embodiment, use of the "solo" control is temporary and this prior selection that previously were selected for the composite track 322 would be retained for use once the "solo" control is deselected.

Figure 4:
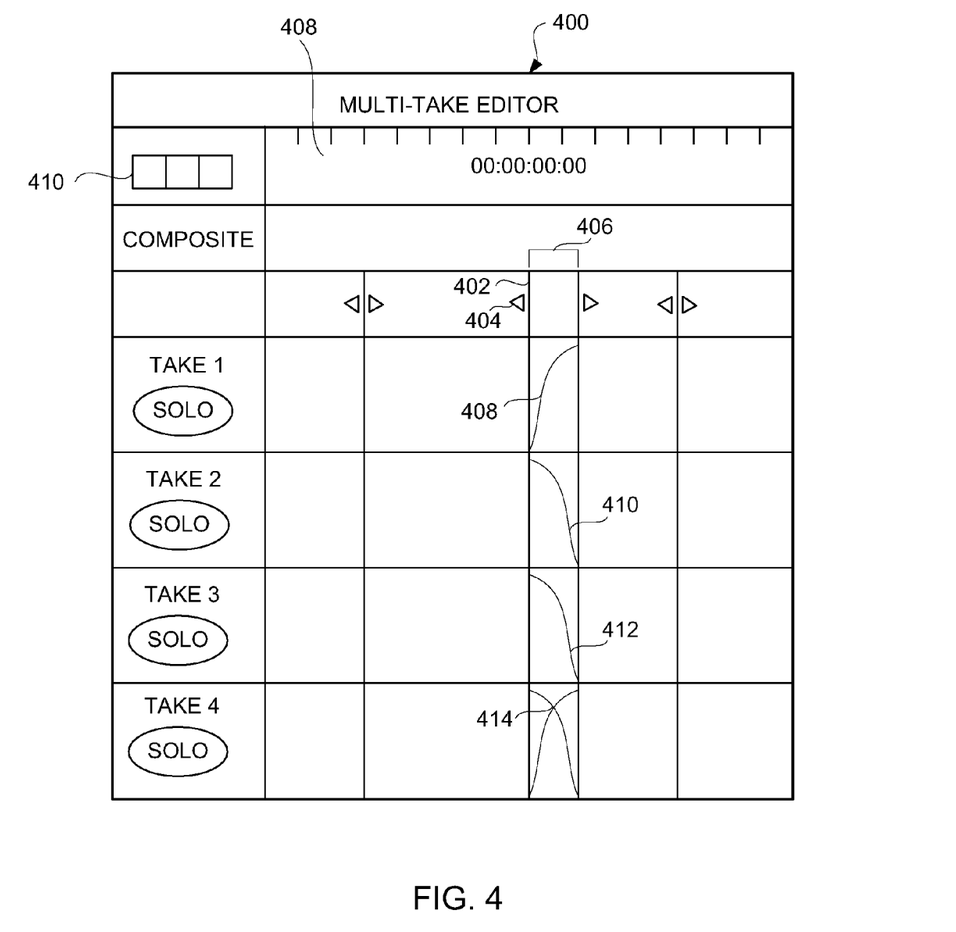
FIG. 4 is a representative screen illustration pertaining to a media edit window according to one embodiment of the invention.

FIG. 4 is a representative screen illustration pertaining to a media edit window 400 according to one embodiment of the invention. The media edit window 400 is generally similar to the media edit window 300 illustrated in FIG. 3. However, additionally, the media edit window 400 illustrates that a transition point 402 can be moved using a transition control 404 to form a transition region 406. The transition region 406 can extend across all of the tracks. For each of the tracks, a transition affect can be set for the transition region 406. The transition effect can, for example, pertain to a cross fade, a fade-in, a fade-out, or other technique used to join audio together. In one embodiment, the transition effect is a fade of a configurable type, where the type can, for example, be configured to linear, logarithmic, exponential or S-curve. The transition effect can be selected or configured by a user. In one embodiment, for each of the tracks, the associated transition region 406 can display an indication 408-414 of a selected transition effect (i.e., fade) to be utilized. The indication 408 indicates that a fade-in is to be utilized. The indications 410 and 412 indicate that a fade-out is to be utilized. The indication 414 indicates that a cross-fade is to be utilized. Accordingly, it should be noted that the selected transition effect for the different tracks can be the same or different.

Still further, the media edit window 400 includes a time line 408. The time line 408 provides a time context for reference with respect to the various tracks 302 that can be presented within the media edit window 400. Still further, the media edit window 400 can include one or more tool controls 410 that allow a user of the media edit window to select an appropriate tool for usage. Although the tool controls 410 can vary with implementation, some examples include a transition tool (for forming regions) and a selection tool (for selecting regions to be active).

Figure 5A:
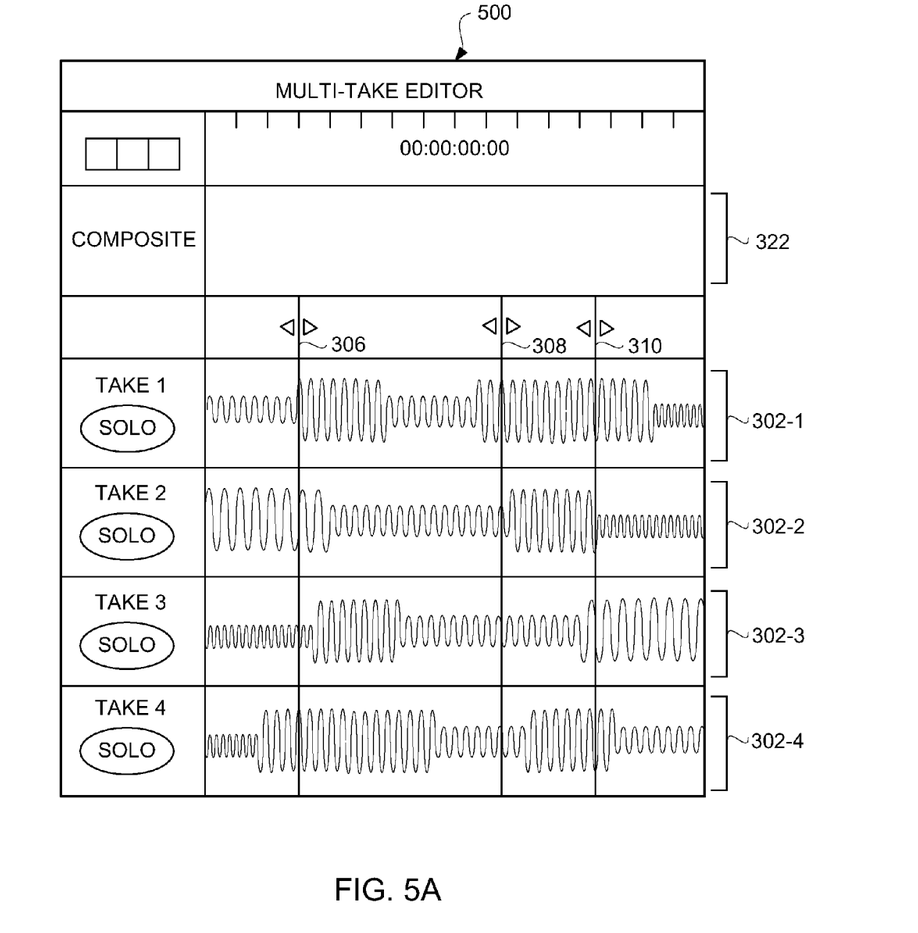
FIG. 5A is a representative screen illustration pertaining to a media edit window according to one embodiment of the invention.

FIG. 5A is a representative screen illustration pertaining to a media edit window 500 according to one embodiment of the invention. The media edit window 500 is generally similar to the media edit window 300 illustrated in FIG. 3 and/or the media edit window 400 illustrated in FIG. 4. The media edit window 500, however, illustrates the tracks 302-1, 302-2, 302-3 and 302-4 as each having an audio recording. In one embodiment, the audio recording in each of the tracks 302-1, 302-2, 302-3 and 302-4 is a different take of a generally common audio content. It should be noted that the audio waveforms depicted in the tracks 302-1, 302-2, 302-3 and 302-4 are exemplary and not necessarily reflecting any characteristics of the audio recordings or their similarities. The audio recording in each of the tracks 302-1, 302-2, 302-3 and 302-4 is denoted into regions (e.g., segments) through use of the transition points 306, 308 and 310. Each of the resulting regions are selectable for inclusion in the composite track 322. However, in FIG. 5A, none of the regions have been selected for inclusion in the composite track 322.

Figure 5B:
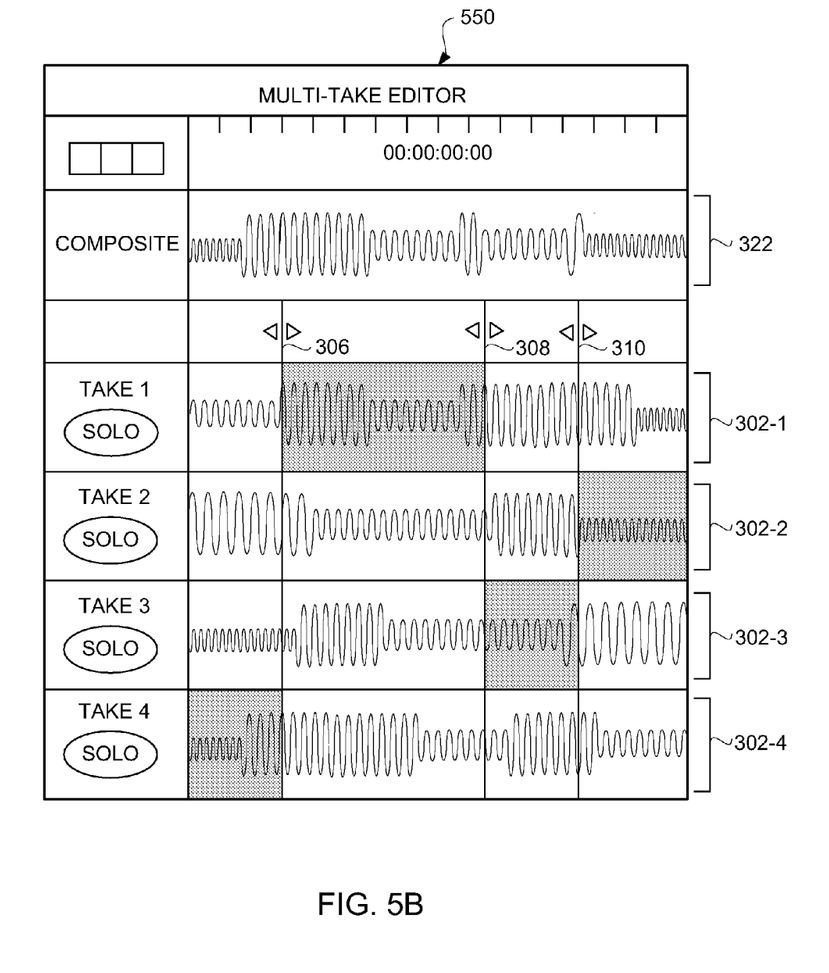
FIG. 5B is a representative screen illustration pertaining to a media edit window according to one embodiment of the invention.

FIG. 5B is a representative screen illustration pertaining to a media edit window 550 according to one embodiment of the invention. The media edit window 550 is generally similar to the media edit window 500 illustrated in FIG. 5A. However, in FIG. 5B, the composite track 322 has been formed from the selection of a number of selected regions. Since, in this embodiment, the regions extend across all the tracks, for a given region, one of the tracks is selected. Hence, each of the regions that together form the composite track 322 can be selected from any of the tracks 302-1, 302-2, 302-3 and 302-4. For example, as illustrated in FIG. 5B, the composite track 322 is illustrated as being formed from (i) the audio recording from the first region the fourth track 302-4, (ii) the audio recording from the second region the first track 302-1, (iii) the audio recording from the third region the third track 302-3, and (iv) the audio recording from the fourth region the second track 302-2. As shown in FIG. 5B, each of the selected regions can be distinctively identified in the media edit window 550. Further, the audio waveform for the composite recording 322 is illustrated in FIG. 5B as a single audio recording made from a combination of the selected regions from the one or more different tracks 302-1, 302-2, 302-3 and 302-4. In any case, the media edit window 550 permits different selections of the regions to be made so as to alter the resulting composite recording 322.

Additionally, in one embodiment, the audio recording, namely, the associated waveform, in a given region can be manipulated by user action. For example, a user could interface with the waveform in a region to move it left or right. As another example, a user might also interact with the waveform in a region to alter its audio characteristics, such as by affecting it volume.

Figure 6A:
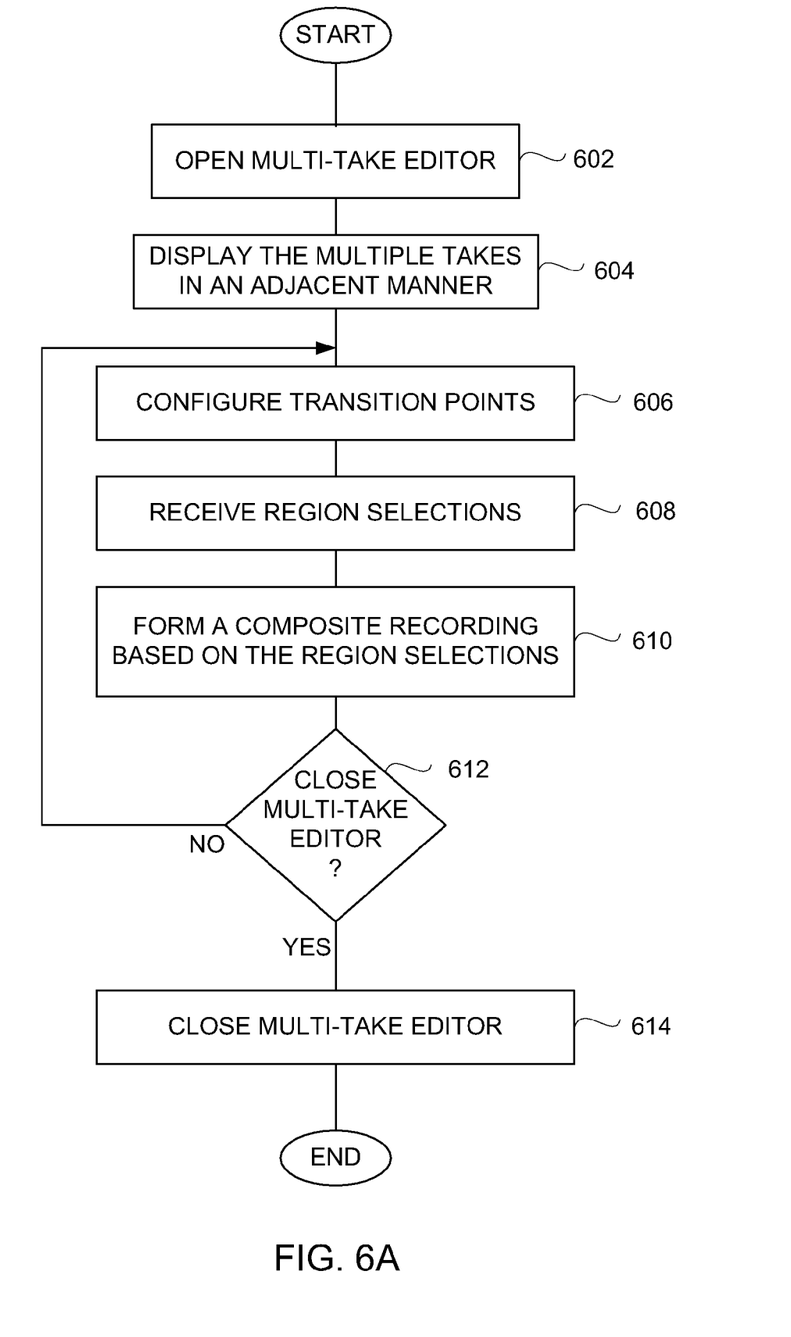
FIGS. 6A and 6B pertain to a multi-take edit process according to one embodiment of the invention.

FIG. 6A illustrates a flow diagram of a multi-take edit process 600 according to one embodiment of the invention. The multi-take edit process 600 is, for example, performed by a computer, such as a personal computer.

The multi-take edit process 600 can begin by opening 602 a multi-take editor. The multi-take editor is, for example, the multi-take editor discussed above in FIGS. 3 and 4. Once the multi-take editor has been opened 602, the multiple takes can be displayed 604 in an adjacent manner. In addition, one or more transition points can be configured 606. The one or more transition points are used to divide the takes into regions. After the one or more transition points have been configured 606, region selections can be received 608. Subsequently, a composite recording can be formed 610 based on the region selections. In addition, while the multi-take editor is open, new takes can be recorded. New takes can also be added by dragging in a take or by selection of a take from a menu. Further, multiple takes could be formed from a take (e.g., by cutting the take into multiple takes).

A decision 612 then determines whether the multi-take editor should close. When the decision 612 determines that the multi-take editor should not close, the multi-take edit process 600 can return to repeat the block 606 and subsequent blocks so that further editing of the multiple takes can be performed to produce the composite recording. Once the decision 612 determines that the multi-take editor can close, the multi-take editor is closed 614. The resulting composite recording can then be used elsewhere on the computing device as a single composite recording, even though the composite recording was assembled from a plurality of different regions from different ones of the takes. After the multi-take editor has closed 614, the multi-take edit process 600 ends. The multi-take editor can subsequently be re-opened to edit the composite recording, for example to change its constituent regions.

Figure 6B:
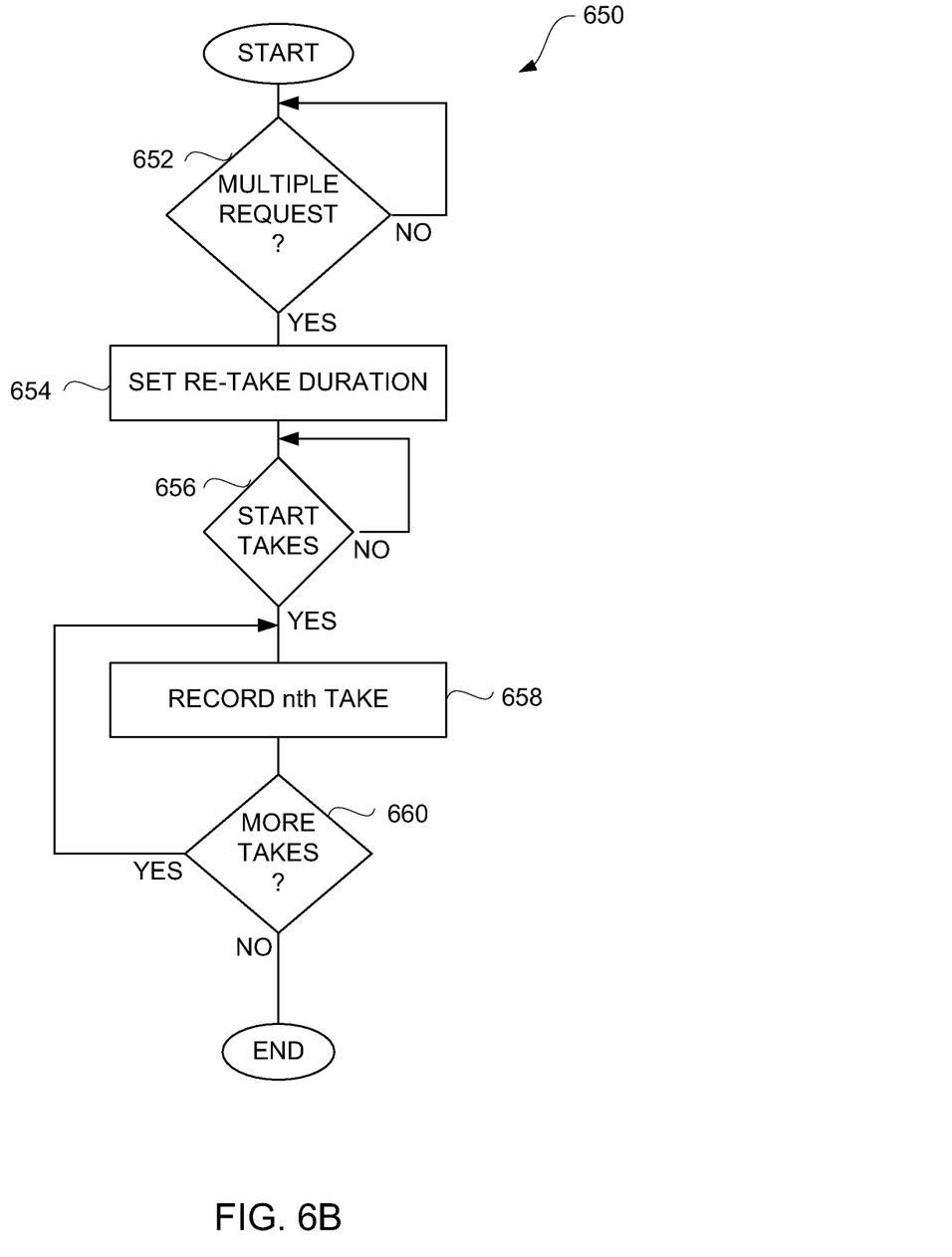

The multiple takes being edited can be accessed in various. One way to acquire multiple takes is through recording of multiple takes. FIG. 6B illustrates a flow diagram of a multi-take recording process 650 according to one embodiment of the invention. The multi-take recording process 650 is, for example, performed by a computer, such as a personal computer.

The multi-take recording process 650 begins with a decision 652. A decision 652 determines whether a multi-take request has been made. When the decision 652 determines that a multi-take request has not been received, the multi-take recording process 650 awaits such a request. In other words, the multi-take recording process 650 is initiated when a multi-take request is received. Once the decision 652 determines that a multi-take request has been received, a take duration is set 654. The take duration is duration of time during which a media clip is recorded during each take.

Next, a decision 656 can determines whether the takes for the recording should be started. When the decision 656 determines that the take should not be started, the multi-take recording process 650 awaits the appropriate time to start the takes. Once the decision 656 determines that the takes should be started, the various takes are recorded 658. Typically, the takes are recorded one after another. In one implementation, the takes are recorded one after another in an automatic successive fashion. A decision 660 determines whether more takes are still to be recorded. When the decision 660 determines that more takes are to be recorded, the multi-take recording process 650 returns to repeat the block 658 so that a next take can be recorded. On the other hand, when decision 660 determines that no more takes are to be recorded, the multi-take recording process 650 can end.

Figure 7:
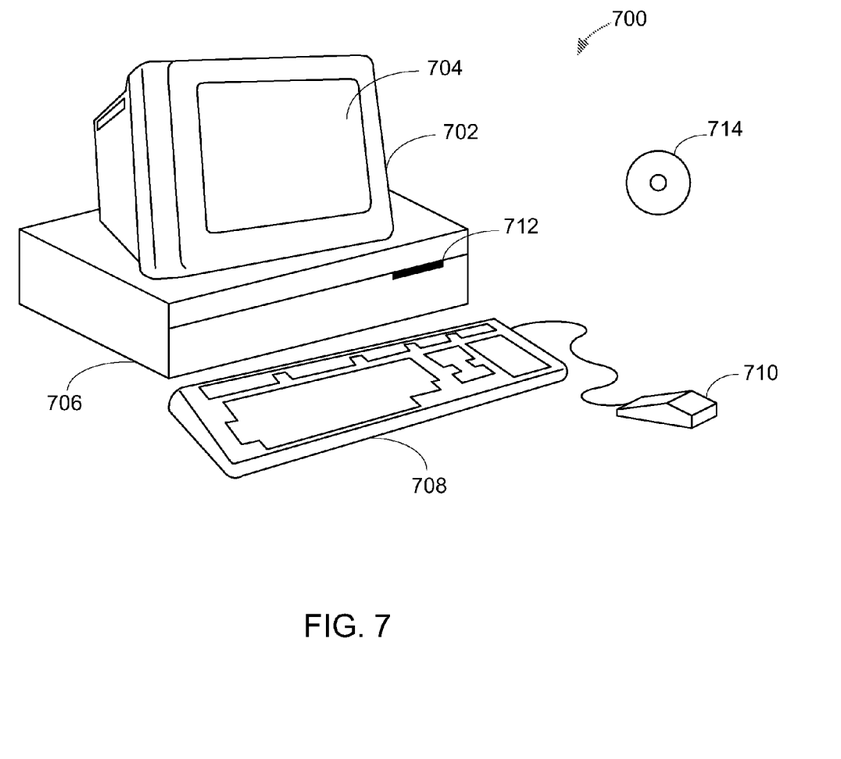
FIG. 7 shows an exemplary computer system suitable for use with the invention.

FIG. 7 shows an exemplary computer system 700 suitable for use with the invention. The methods, processes and/or graphical user interfaces discussed above can be provided by a computer system. The computer system 700 includes a display monitor 702 having a single or multi-screen display 704 (or multiple displays), a cabinet 706, a keyboard 708, and a mouse 710. The cabinet 706 houses a processing unit (or processor), system memory and a hard drive (not shown). The cabinet 706 also houses a drive 712, such as a DVD, CD-ROM or floppy drive. The drive 712 can also be a removable hard drive, a Flash or EEPROM device, etc. Regardless, the drive 712 may be utilized to store and retrieve software programs incorporating computer code that implements some or all aspects of the invention, data for use with the invention, and the like. Although CD-ROM 714 is shown as an exemplary computer readable storage medium, other computer readable storage media including floppy disk, tape, Flash or EEPROM memory, memory card, system memory, and hard drive may be utilized. Additionally, a data signal embodied in a carrier wave (e.g., in a network) may be the computer readable storage medium. In one implementation, a software program for the computer system 700 is provided in the system memory, the hard drive, the drive 712, the CD-ROM 714 or other computer readable storage medium and serves to incorporate the computer code that implements some or all aspects of the invention.

The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that composite recordings can be formed from constituent parts selected from a plurality of individual media tracks. As an example, the constituent parts are media tracks that can pertain to multi-takes, such that different portion from different takes are able to be easily combined to produce a composite media track that is deemed more useful than any of the individual media tracks. Alternatively, as another example, the constituent parts are media tracks that can pertain to arbitrary media tracks. Another advantage of the invention is that a composite track can be re-edited after being created. Still another advantage of the invention is that transition effects can be applied when merging constituent parts.

U.S. Provisional Patent Application No. 60/911,886, filed concurrently, and entitled "MULTIPLE VERSION MERGE FOR MEDIA PRODUCTION," is hereby incorporated herein by reference.

U.S. patent application Ser. No. 11/735,466, filed concurrently, and entitled "MULTI-FRAME VIDEO DISPLAY METHOD AND APPARATUS," is hereby incorporated herein by reference.

U.S. Provisional Patent Application No. 60/911,884, filed concurrently, and entitled "TECHNIQUES AND TOOLS FOR MANAGING ATTRIBUTES OF MEDIA CONTENT," is hereby incorporated herein by reference.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as failing within the scope of the invention.

What is claimed is:

1. A computer-implemented method for producing a composite media asset from a plurality of digital media assets, said method comprising:
accessing a plurality of digital media assets, each of the plurality of digital media assets being a different take of a particular media content;
forming a plurality of media segments in each of the plurality of digital media assets, wherein each media segment in one of the digital media assets corresponds to one media segment in each of the other digital media assets, has a same duration as the corresponding media segment in the other digital media assets and is located at the same position with the corresponding media segments in the other digital media assets; and
receiving selections of the media segments from one or more of the digital media assets.

2. A method as recited in claim 1, wherein said method further comprises:
combining the selected media segments into a composite audio recording.

3. A method as recited in claim 1, wherein said method further comprises:
concurrently displaying the digital media assets.

4. A method as recited in claim 1, wherein the digital media assets are individual recordings.

5. A method as recited in claim 4, wherein said accessing comprises recording the individual recordings.

6. A method as recited in claim 1, wherein said method further comprises:
resizing at least one of the media segments.

7. A method as recited in claim 1, wherein each selected media segment is displayed in the digital media asset to which the selected media segment belongs in a visually distinctive manner as compared to other non-selected media segments.

8. A method as recited in claim 1, further comprises sizing a transition region between consecutive media segments in one digital media asset, the transition region extending across all of the media segments in other digital media assets that are associated with the consecutive media segments.

9. A computer-implemented method for producing a composite audio recording from a plurality of individual recordings, said method comprising:
obtaining a plurality of individual recordings, the individual recordings being different takes of particular media content;
concurrently displaying the individual recordings;
configuring transition points with respect to the individual recordings to form a plurality of media segments in each of the individual recordings, each transition point being located in each of the plurality of individual recordings and at the same position for each of the plurality of individual recordings;
receiving selections of the media segments from different ones of the individual recordings; and
combining the selected media segments into a composite audio recording.

10. A method as recited in claim 9, wherein said displaying operates to display the individual recordings in an adjacent manner.

11. A method as recited in claim 9, wherein the particular media content is a particular audio content.

12. A method as recited in claim 11, wherein the individual recordings are of substantially the same length.

13. A method as recited in claim 9, wherein said displaying operates to concurrently display the individual recordings left-to-right with the individual recordings being arranged vertically stacked one on another.

14. A method as recited in claim 9, wherein the transition points are the same for all of the individual recordings.

15. A method as recited in claim 9, wherein said configuring of each of the transition points forms an media segment with respect to each of the individual recordings.

16. A method as recited in claim 9, wherein the media segments for each of the individual recordings are aligned.

17. A method as recited in claim 9, wherein said method further comprises:
moving at least one of the transition points.

18. A method as recited in claim 9, wherein said method further comprises:
sizing at least one of the transition points into a transition region; and
associating a transition effect to the transition region.

19. A method as recited in claim 9, wherein the transition effect is at least one of a crossfade, fade out, or fade in.

20. A method as recited in claim 19, wherein the transition effect is a fade of a configurable type.

21. A method as recited in claim 9, wherein the selected media segments are displayed in a visually distinctive manner as compared to other non-selected media segments.

22. A method as recited in claim 9, wherein said method further comprises:
playing the composite audio recording.

23. A method as recited in claim 9, wherein said method further comprises:
subsequently receiving at least one selection that differs from the previously selected media segments; and
combining the currently selected media segments to update the composite audio recording.

24. A method as recited in claim 9, wherein the media segments are audio segments.

25. A method as recited in claim 9, wherein the media segments are video segments.

26. A method as recited in claim 9, wherein each selected media segment is displayed in the digital media asset to which the selected media segment belongs in a visually distinctive manner as compared to other non-selected media segments.

27. A non-transitory computer readable medium including at least computer program code for producing a composite audio recording from a plurality of digital media assets, said computer readable medium comprising:
computer program code for obtaining a plurality of digital media assets, each of the plurality of digital media assets being different takes of a particular media content;

computer program code for concurrently displaying the digital media assets;

computer program code for forming a plurality of regions in each of the digital media assets, wherein a region in one of the digital media assets corresponds to one region in each of the other digital media assets, has a same duration as the corresponding regions in the other digital media assets and is located at the same position with the corresponding regions in the other digital media assets;

computer program code for receiving selections of the regions from different ones of the digital media assets; and computer program code for forming a composite recording based on the region selections.

28. A computer readable medium as recited in claim 27, wherein the different regions of the digital media assets are user-selectable.

29. A computer readable medium as recited in claim 28, wherein after or as one or more of the different regions of the digital media assets are selected, said composite audio track representation is automatically updated.

30. A computer readable medium as recited in claim 27, wherein the digital media assets and the composite recording are audio recordings.

31. A computer readable medium as recited in claim 27, wherein said computer program code for displaying operates to display the digital media assets in an adjacent manner.

32. A computer-implemented method for producing a composite audio recording from a plurality of individual recordings, said method comprising:

displaying a first audio track representation, the first audio track representation including a waveform of audio content of a first audio track;

displaying a second audio track representation, the second audio track representation including a waveform of audio content of a second audio track;

displaying a first transition indicator, the first transition indicator being displayed across both the first audio track representation and the second audio track representation;

segmenting the first audio track into a plurality of segments based on at least the first transition indicator;

segmenting the second audio track into a plurality of segments based on at least the first transition indicator, wherein each segment in the second audio track corresponds to one of the segments in the first audio track, has a same duration as the corresponding segment in the first audio track, and is located at the same position with the corresponding segment in the first audio track;

receiving a first user selection of one of the segments of the first audio track or the second audio track as a first selected segment;

receiving a second user selection of one of the segments of the first audio track or the second audio track as a second selected segment, the second selected segment being from a different one of the audio tracks than the audio track associated with the first selected segment; and displaying a composite audio track representation, the composite audio track representation including a waveform of audio content of a composite audio track, the composite audio track representation is a waveform that is a composite from (i) at least a portion of the waveform of audio content of the first audio track or the second audio track corresponding to the first selected segment and (ii) at least a portion of the waveform of audio content of the first audio track or the second audio track corresponding to the second selected segment.

33. A computing apparatus, comprising:

an audio pickup device suitable for obtaining multiple takes of a particular audio recording;

a display device capable of concurrently displaying a representation of the multiple takes;

a memory configured to store at least audio content pertaining to the multiple takes; and a processing device operatively connected to said audio pickup device, said display device and said memory, said processing device operating to at least:

cause the multiple takes to be displayed on the display device in an adjacent manner;

form a plurality of regions in each of the multiple takes, wherein a region in one of the multiple takes corresponds to one region in each of the other multiple takes, has a same duration as the corresponding region in the other multiple takes and is located at the same position with the corresponding regions in the other multiple takes;

receive region selections from the regions formed with respect to the multiple takes; and associating audio segments associated with the region selections to form a composite audio recording.

34. A computing apparatus as recited in claim 33, wherein said processor is further configured to play the composite audio recording.

* * * * *